United States Patent [19]

Shimizu

[11] Patent Number: 4,536,417

[45] Date of Patent: Aug. 20, 1985

[54] METHOD FOR REPAIRING AND RESTORING DETERIORATED CEMENT-CONTAINING INORGANIC MATERIAL

[75] Inventor: Toshihiko Shimizu, Narashino, Japan

[73] Assignee: Onoda Construction Materials Co., Ltd., Tokyo, Japan

[21] Appl. No.: 560,014

[22] Filed: Dec. 9, 1983

[51] Int. Cl.$^3$ .............................................. B32B 35/00
[52] U.S. Cl. ................... 427/140; 427/397.8; 427/403; 427/427; 427/393.6
[58] Field of Search ............ 427/140, 299, 397.8, 427/427, 403, 407.1, 419.1, 393.6

[56] References Cited

U.S. PATENT DOCUMENTS

| 2,354,351 | 7/1941 | Schultz | 427/403 |
| 2,794,752 | 6/1957 | Schmidt | 427/393.6 |
| 4,292,351 | 9/1981 | Ito et al. | 427/403 |
| 4,443,496 | 4/1984 | Obitsu et al. | 427/397.8 |

FOREIGN PATENT DOCUMENTS 523349  7/1940  United Kingdom ............... 427/403

Primary Examiner—S. L. Childs
Attorney, Agent, or Firm—Jordan and Hamburg

[57] ABSTRACT

A method for repairing and restoring a deteriorated cement-containing inorganic material such as reinforced concrete by applying a solution of a water-soluble silicate compound to its surface to have it impregnated with said solution, and then topcoating said material with cement paste or/and mortar.

4 Claims, No Drawings

METHOD FOR REPAIRING AND RESTORING DETERIORATED CEMENT-CONTAINING INORGANIC MATERIAL

BACKGROUND OF THE INVENTION

1. Field of the Invention

This invention relates to a method for repairing and restoring a deteriorated cement-containing inorganic material, typically reinforced concrete, according to which the repaired cement-containing inorganic material can be kept alkaline semipermanently.

2. Description of Prior Art

A reinforced concrete structure is a complex durable structure of cement concrete with reinforcements which are protected against rusting in a highly alkaline atmosphere in the concrete, but the concrete itself is carbonated by carbon dioxide in the air to cause rusting of the reinforcements over a long-time period. When the reinforcements are rusted, the covering concrete cracks due to the cubic expansion pressure, and oxygen and moisture enter from the cracks to promote rusting, thus causing scale-off of the covering concrete. As a result of the repetition of such an action, the reinforced concrete structure is badly impaired in its durability. Such a phenomenon may occur in short-time use if the structure is placed under certain environmental conditions. It is aggravated by fire or exposure to exhaust gas, and especially marine structures or structures located close to the seaside tend to suffer such damage early in use since the reinforcements of these structures are always exposed to a corrosive environment.

This phenomenon is observed not only in reinforced concrete but also in other inorganic materials containing cement. These materials are hardened and petrified in long-time use under various conditions. These cement-containing inorganic materials are most suited for general structures and buildings because of their excellent rigidity and durability, but they suffer such damage and aging gradually or even rapidly (in short-time use) under certain conditions not only due to the carbonating actions (which are caused and/or promoted not only by carbon dioxide in the air but also by exhaust gas, fire, etc.) but also under the influences of other factors such as penetration of water (including seawater and water containing acids, alkalis, salts, etc.) and oils, wear, cavitation, alkali-aggregate reactions, etc. Further, in the case of cement concrete, it usually inevitably suffers from cracking due to shrinkage on drying and other types of structural cracking, and if cracks are formed in such concrete, its waterproofness is degraded to let weathering such as carbonation of concrete advance deep into the inside thereof.

Thus, if such deterioration of quality or durability of a reinforced concrete structure or component inorganic material thereof, such as cement concrete is left unattended, the structure will turn into a dangerous state which may lead to a disaster. To avoid this, it is desirable to rebuild the structure, but due to the need to save material and energy in these years, repairing and restoring of the structure and its component material is now given serious consideration, and an advanced technique for such reparing and restoring of material is sought after in the field of civil engineering and construction, too.

Hitherto, repairing of a reinforced concrete structure has been made by applying an anti-corrosive paint such as zinc-rich paint or an epoxy resin to the exposed reinforcements, or the damaged section has been tentatively repaired by injecting an epoxy resin or the like into the cracked portion of the concrete, since no effective alkalinity recovery method was available for the repairment of the carbonated portion of the concrete. However, zinc-rich paint is unable to protect the alkali in the concrete in a satisfactory way, while the epoxy resin has problems not only in workability and economy but also, more importantly, in durability since it is an organic compound. In the use of the epoxy resin for repair of marine structures, a case is reported where corrosion of the inside reinforcements started again in about one year after the repair work. Therefore, in view of the durability after the repair work, it is desirable to use an inorganic compound as the repairing material for the reinforced concrete structures. On the other hand, utilization of a special colloidal silica prepared by combining an alkali metal silicate and an ammonium silicate compound has been studied for preventing surface deterioration of inorganic material (Japanese Patent Publication No. 19609/1978). However, although such a colloidal silica has excellent water and weather resistance, it is poor in its ability to recover alkalinity in the carbonated portion of the concrete because of a high molar ratio of $SiO_2$ and a low alkalinity. Also, since such a colloidal silica is composed of colloidal particles, its penetrability into the inside of concrete is lower than that of watersoluble compounds.

Surface reinforcement of the inorganic material by impregnation with a water-soluble silicate compound is also considered, but such a compound tends to be eluted to lose its effect in long-time use because of its poor water resistance after curing. Also, mere coating with cement paste alone or together with a high polymer dispersion or mere mortar grouting on the scaled-off portion of concrete is unsatisfactory for reinforcing the concrete body or for preventing corrosion of the reinforcements by recovery of alkalinity because of poor penetrability into the inside of the aged or deteriorated concrete.

Thus, a means for realizing recovery of alkalinity in the inside carbonated portion of concrete and its surface reinforcement by impregnation with a water-soluble silicate compound and at the same time the development of a topcoat (with cement paste or mortar) for preventing elution of the water-soluble silicate compound have been keenly required.

SUMMARY OF THE INVENTION

Under these circumstances, the present invention was worked out with the object of providing an effective method for repairment and restoration of a deteriorated cement-containing inorganic material by applying a solution of water-soluble silicate compound to its surface to impregnate the material with said solution and then topcoating the surface of the impregnated inorganic material with cement paste or mortar, or coating mortar on cement paste, to thereby eliminate the defects of the prior art and to provide reinforcement and repair of the weakened layer of the cement-containing inorganic material and the prevention of advancement of deterioration of the material while also preventing corrosion of the reinforcements to improve the durability of said material by the synergistic effect of said silicate solution and topcoat.

DETAILED DESCRIPTION OF THE INVENTION

The repairing and restoring method for a deteriorated cement-containing inorganic material according to this invention will be described in detail below in accordance with the respective steps of the method.

(1) Step of applying a solution of a water-soluble silicate compound to the surface of a cement-containing inorganic material to have the latter impregnated with said solution.

This is the first step of the method of this invention in which a solution of a water-soluble silicate compound is applied to the surface of a cement-containing material such as concrete to have it impregnated with said solution. The water-soluble silicate compound used in this step is a silicate represented by the general formula: $M_2O \cdot nSiO_2$ (wherein M is Li, Na, K, Cs or an ammonium component, and n is an integer), alone or as a mixture with other substance(s). As the ammonium component, examples are primary amines such as methylamine and ethylamine, secondary amines such as dimethylamine and diisopropylamine, tertiary amimes such as trimethylamine and triethanolamine, quaternary ammoniums such as monomethyltriethanolammonium and tetraethanolammonium, and ammonia. The value of n is preferably around 1 to 5, but it is not specifically defined and may be suitably selected within the range that will not affect the water solubility and penetrability of the compound when it is actually used. An additive or additives such as a curing agent for improving water resistance of the silicate compound after curing by drying may be added in an amount which does not affect the workability and penetrability of the compound. If the silicate compound is to be used without any additive, it is recommended to use lithium silicate which has a relatively high water resistance. Though the concentration of the silicate compound solution used in this invention is not specifically defined, usually it is less than 30%. The thus prepared solution of a water-soluble silicate compound is infiltrated into the body of the deteriorated material such as concrete and then dried while maintaining the surrounding thereof in an alkaline state, whereby a hard ground is obtained.

(2) Step of topcoating with cement paste.

Topcoating with cement paste in this step is usually accomplished by spray coating or trowelling to a thickness less than several mm. The cement paste used for this topcoating has the following composition:
 (a) cement: 40–60 parts
 (b) aggregate smaller than 0.3 mm in size: 60–40 parts
 (c) anion-polymerized styrene/butadiene rubber (SBR-A) dispersion (solid content): 2–8 parts Usually Portland cement is used as the cement paste, but other types of cement may be used in some cases. The "SBR-A dispersion" is a styrene/butadiene copolymer dispersion obtained by copolymerizing styrene with butadiene by using an anionic surfactant as the emulsifier or polymerizing agent. Usually a dispersion with a styrene content (in the whole dispersion) of 40 to 65 % is used, but an especially good result is obtained when the styrene content is 50 to 65%. Mixing of this SBR-A dispersion can amazingly better adhesion of the coating to the body of the inorganic material such as concrete and can further improve the waterproofing properties and airtightness of the plastering in comparison with the case where an SBR-C dispersion obtained by using other polymerizing agents, such as a cationic surfactant, or other polymer dispersion is mixed, and thus the use of said SBR-A dispersion can provide cement paste which is capable of best attaining the object of this invention.

If necessary, a commercially available anti-corrosive for reinforced concrete may be added to the cement paste.

(3) Step of topcoating with mortar.

This mortar coating is performed either immediately after the step (1) or after completion of the steps (1) and (2).

This mortar coating is usually accomplished by spray coating or trowelling to a thickness of usually less than several mm. In case the worn-off portion of concrete is deep, this mortar coating may be applied for filling said portion.

The mortar used in this step has the following composition:
 (a) cement: 20–40 parts
 (b) aggregate smaller than 1.2 mm in size: 80–60 parts
 (c) SBR-A dispersion (solid content): 2–8 parts The cement and SBR-A dispersion used as the mortar components are the same as those used in the cement paste described in step (2) above.

This mortar is intended to improve the waterproofing properties and airtightness like the cement paste used in step (2). Since the mortar of the above composition is especially resistant to cracking, use of such mortar conducive to the attainment of the object of this invention.

A conventional repair method for concrete or the like is usually finished by the application of the cement paste of step (2), but, the above mortar topcoating step in further added to drastically improve the weather resistance (durability) after the repair work.

The deteriorated cement-containing inorganic material to be actually repaired may present various conditions such as: (a) merely cracks are formed in the concrete; (b) scale-off of the concrete has not reached the reinforcement but the carbonation has advanced close to the reinforcement; and (c) scale-off of the concrete has reached the reinforcement make it bare. In any of these cases, step (2) (application of cement paste) or (3) (application of mortar) or the combination of both steps (2) and (3) is performed after completion of step (1) (application of water-soluble silicate compound). The actual repair work is usually conducted in the following way: water-soluble lithium silicate is applied to penetrate into a portion to be repared, followed by coating with cement paste, and the cases where the worn-off portion is deep, the mortar is applied to fill up the gap, and then this portion is further topcoated with cement paste and mortar in that order to finish into a planar surface.

Next, the results of measurement of (a) depth of carbonation, (b) water adsorption, (c) presence or absence or crack(s), (d) presence or absence of alkalinity in the reinforcement atmosphere mortar and (e) area of reinforcement rusting in the application of the cement paste and mortar according to this invention under the given conditions in comparison with the results obtained in the similar application of cement pastes containing polymer dispersions other than SBR-A and mortar are shown with the test methods used.

TEST Methods (A) The compositions of the cement pastes and mortar used in the tests are shown in Table 1 (all the tables are at the end of the specification).

In Table 1, the compositions of the respective specimens are shown by the parenthesized numerical figures.

(a) Samples Nos. 101 to 109: these are specimens comprising a 1:3 mixture of Portland cement and aggregate smaller than 0.3 mm in diameter (standard sand mortar, for comparative test) to which, in addition to SBR-A used in this invention, an ethylene/vinyl acetate/vinyl chloride copolymer emulsion, an acrylic ester/styrene copolymer emulsion, an acrylic ester emulsion, an ethylene/vinyl acetate copolymer emulsion, SBR-C (cation-polymerized styrene/butadiene copolymer powder), VAc/Veova (vinyl acetate/vinyl versatate copolymer emulsion) and VAc/Veova/vinyl laurate (vinyl acetate/vinyl versatate/vinyl laurate copolymer powder) were added as additional polymer dispersions, each in an amount of 3.0% as solid matter, or no such polymer dispersion was added (nine specimens in all).

(b) Sample Nos. 201 to 209: specimens comprising a 1:1 mixture of Portland cement and aggregate smaller than 0.3 mm in diameter (cement paste) to which the same polymer dispersions as specified in (a) above were added or no such dispersion was added (nine specimens in all).

(c) Sample Nos. 301 to 309: specimens comprising a 1:2.33 mixture of Portland cement and aggregate smaller than 1.2 mm in diameter (mortar) to which the same polymer dispersions as specified in (a) above were added or no such dispersion was added (nine specimens in all).

(B) Amount of water added to the specimens

The amount of water added (including water in the polymer dispersion) required for attaining a slump value of 35±5 in the slump test according to JIS A 1173 (Method of test for slump of polymer-modified mortar).

(C) Depth of carbonation

Phenolphthalein indicator was sprayed to the broken-out section and the non-reddened portion was measured.

(D) Water absorption

Water absorption was measured according to JIS A 6203 (Polymer dispersions for cement modifier) under drying conditions of 60° C. and 48 hours.

(E) Standing under standard conditions (standard curing)

Standing at 20° C. and 90% RH for 2 days, then in water of 20° C. for 5 days, and at 20° C. and 60% RH for 21 days.

(F) Carbonization conditions

Left to stand under 100% $CO_2$ and 4 kg/cm$^2$ after the above standard curing.

(G) Drying-immersion repetition test

The cycle of 2-day drying (standing) in the air at 60° C. and 2-day immersion in 20° C. water or in a 5% saline solution was repeated 10 times.

(H) Weight change

Measured by as scale which can gauge up to 10 mg.

(I) Presence or absence of cracks

Determined by observing the 4×4×9 cm reinforced specimens with the eye.

(J) Presence or absence of alkalinity in reinforcement atmosphere mortar

Determined by using a phenolphthalein indicator.

(K) Area of reinforcement rusting

The rust was reproduced on a polyethylene sheet to draw up a developed plan and it was copied and analyzed by a video pattern analyzer. Test Results (a) Depth of carbonation (mm)

The results of measurement of the depth of carbonation conducted under various (six different) conditions are shown in Table 2. Under any condition, the depth of carbonation observed when using the cement paste (Sample No. 206) and mortar (Sample No. 306) according to this invention was equal to or less than those observed when using other specimens, indicating an excellent airtightness of the coating according to this invention.

(b) Water absorption (%)

The test results are shown in Table 3. The cement paste and mortar used in this invention were both low in water absorption, indicating their excellent waterproofing properties.

(c) Weight change

The result of determination of weight change (%) under various (five different) conditions are shown in Table 4.

The cement paste and mortar used in this invention were small in weight change, indicating little increase of weight by the rusting of the reinforcement.

(d) Formation of cracks

The results of visual observation of cracks under various (four different) conditions are shown in Table 5. In the table, + indicates presence of crack(s) and − indicates no formation of cracks.

The cement paste and mortar used in this invention were resistant to cracks and excellent in durability. Especially, the mortar used in this invention resulted in no development of cracks under any condition.

(e) Alkalinity of reinforcement atmosphere mortar

The results of examination of alkalinity of reinforcement atmosphere mortar under various (four different) conditions are shown in Table 6. In the table, O indicates that the mortar was not carbonated, Δ indicates that the mortar was partially carbonated, and X indicates that the mortar was carbonated. The cement paste and mortar used in this invention have a stronger ability to maintain the surrounding of the reinforcement alkaline than the other samples.

(f) Area (%) of reinforcement rusting

The results of measurement of the area of reinforcement rusting under various (four different) conditions are shown in Table 7. The cement paste and mortar used in this invention formed a smaller rusted area of reinforcement than the other preparations under any condition.

The foregoing test results being judged as a whole, the mortar used in this invention gave the best result in each test and the cement paste according to this invention showed the next best result.

Also, among the polymer dispersions tested, SBR-A showed the best result in almost all of the tests.

Now the embodiments of the present invention will be described.

EXAMPLE 1

A building with six stories above and one under the ground (normal concrete being used for the floor underground and light-weight concrete for the floors above the ground) which experienced a fire 20 years after the construction had 30–40 mm deep carbonation of light-weight concrete. In repair work of the interior, ceiling and beams of this building, a lithium silicate solution (12% solution) was applied (twice at a rate of 600 g/m$^2$) to the beams and the backside of the ceiling to infiltrate said solution into these portions and then cement paste comprising a 1:1 mixture of cement and sand containign 4.5% (as solids) of an anion-polymerized styrene/-butadiene rubber latex was spray coated to the surfaces of said portions to a thickness of 1 to 1.5 mm, followed by finish spray coating with mortar comprising a 1:2.3 cement/sand mixture containing 4.3% (as solids) of an anion-polymerized styrene/butadiene rubber latex to a coating thickness of 2 to 2.5 mm. The examination of the repaired portions one year after the repair work showed no abnormalies at all.

EXAMPLE 2

The backside of the ceiling and the beams in the building of Example 1 were treated in the same way as in Example 1, that is, a lithium silicate solution was applied to said portions, then the surfaces thereof were spray-coated with a 1:1 cement/sand mortar containing 4.5% (as solids) of an anion-polymerized styrene/-butadiene rubber latex to a thickness of 1 to 1.5 mm, followed by spray-coating with 1:2.3 cement/sand mortar containing 4.3% (as solids) of an anion-polymerized styrene/butadiene rubber latex, and then the mortar coating was brush finished followed by finish spray coating with pearlite. The examination of the repaired portions one year after the repair work showed no abnormalies at all.

EXAMPLE 3

In the building of Example 1, the back side of the ceiling was treated in the same way as in Example 1 except that mortar coating was conducted by trowelling instead of spray-coating, followed by finish spray-coating with a paint. The examination of the repaired portion one year after the repair work showed no abnormalies at all.

According to this invention, as described above, first a solution of a water-soluble silicate compound is applied to infiltrate into the deteriorated reinforced concrete or such and then the surface thereof is topcoated with cement paste containing SBR-A, mortar, or a mortar mixture containing said cement paste and mortar, so that the plastering can perfectly prevent rusting of the reinforcement even under very severe conditions owing to the synergistic effect brough about by said plastering material and the infiltrated water-soluble silicate compound.

TABLE 1

|  | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
|---|---|---|---|
| no such polymer dispersion was added | (101) | (201) | (301) |
| ethylene/vinyl acetate/vinyl chloride copolymer emulsion | (102) | (202) | (302) |
| acrylic ester/styrene copolymer emulsion | (103) | (203) | (303) |
| acrylic ester emulsion | (104) | (204) | (304) |
| ethylene/vinyl acetate copolymer emulsion | (105) | (205) | (305) |
| SBR-A | (106) | (206) | (306) |
| SBR-C | (107) | (207) | (307) |
| VAc/Veova (powder) | (108) | (208) | (308) |
| VAc Veova/vinyl laurate (powder) | (109) | (209) | (309) |

TABLE 2

|  | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
|---|---|---|---|
| *(1) After standing under standard* | | | |
| no such polymer dispersion was added | 4 (101) | 1 (201) | 0 (301) |
| ethylene/vinyl acetate/vinyl chloride copolymer emulsion | 0 (102) | 0 (202) | 0 (302) |
| acrylic ester/styrene copolymer emulsion | 2 (103) | 0 (203) | 0 (303) |
| acrylic ester emulsion | 0 (104) | 0 (204) | 0 (304) |
| ethylene/vinyl acetate copolymer emulsion | 0 (105) | 0 (205) | 0 (305) |
| SBR-A | 0 (106) | 0 (206) | 0 (306) |
| SBR-C | 3 (107) | 0 (207) | 0 (307) |
| VAc/Veova (powder) | 3 (108) | 0 (208) | 0 (308) |
| VAc Veova/vinyl laurate (powder) | 2 (109) | 0 (209) | 0 (309) |
| *(2) After carbonization* | | | |
| no such polymer dispersion was added | 20 (101) | 4 (201) | 3 (301) |
| ethylene/vinyl acetate/vinyl chloride copolymer emulsion | 3 (102) | 1 (202) | 0 (302) |
| acrylic ester/styrene copolymer emulsion | 6 (103) | 1 (203) | 0 (303) |
| acrylic ester emulsion | 5 | 1 | 0 |

TABLE 2-continued

| | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
|---|---|---|---|
| | (104) | (204) | (304) |
| ethylene/vinyl acetate copolymer emulsion | 13 | 1 | 0 |
| | (105) | (205) | (305) |
| SBR-A | 2 | 1 | 0 |
| | (106) | (206) | (306) |
| SBR-C | 11 | 3 | 3 |
| | (107) | (207) | (307) |
| VAc/Veova (powder) | 20 | 3 | 2 |
| | (108) | (208) | (308) |
| VAc Veova/vinyl laurate (powder) | 7 | 2 | 2 |
| | (109) | (209) | (309) |
| (3) After drying-immersion repetition (A) Drying under standard, then immersion in water | | | |
| no such polymer dispersion was added | 2 | 2 | 1 |
| | (101) | (201) | (301) |
| ethylene/vinyl acetate/vinyl chloride copolymer emulsion | 0 | 1 | 0 |
| | (102) | (202) | (302) |
| acrylic ester/styrene copolymer emulsion | 1 | 0 | 0 |
| | (103) | (203) | (303) |
| acrylic ester emulsion | 0 | 0 | 0 |
| | (104) | (204) | (304) |
| ethylene/vinyl acetate copolymer emulsion | 0 | 0 | 0 |
| | (105) | (205) | (305) |
| SBR-A | 0 | 0 | 0 |
| | (106) | (206) | (306) |
| SBR-C | 1 | 1 | 1 |
| | (107) | (207) | (307) |
| VAc/Veova (powder) | 2 | 2 | 1 |
| | (108) | (208) | (308) |
| VAc Veova/vinyl laurate (powder) | 1 | 1 | 0 |
| | (109) | (209) | (309) |
| (3) After drying-immersion repetition (B) Drying under standard, then immersion in saline solution | | | |
| no such polymer dispersion was added | 1 | 2 | 1 |
| | (101) | (201) | (301) |
| ethylene/vinyl acetate/vinyl chloride copolymer emulsion | 0 | 1 | 0 |
| | (102) | (202) | (302) |
| acrylic ester/styrene copolymer emulsion | 1 | 0 | 0 |
| | (103) | (203) | (303) |
| acrylic ester emulsion | 0 | 0 | 0 |
| | (104) | (204) | (304) |
| ethylene/vinyl acetate copolymer emulsion | 0 | 0 | 0 |
| | (105) | (205) | (305) |
| SBR-A | 0 | 0 | 0 |
| | (106) | (206) | (306) |
| SBR-C | 1 | 0 | 1 |
| | (107) | (207) | (307) |
| VAc/Veova (powder) | 2 | 0 | 1 |
| | (108) | (208) | (308) |
| VAc Veova/vinyl laurate (powder) | 1 | 0 | 0 |
| | (109) | (209) | (309) |
| (3) After drying-immersion repetition (C) Drying after carbonization, then immersion in water | | | |
| no such polymer dispersion was added | 20 | 4 | 4 |
| | (101) | (201) | (301) |
| ethylene/vinyl acetate/vinyl chloride copolymer emulsion | 3 | 2 | 1 |
| | (102) | (202) | (302) |
| acrylic ester/styrene copolymer emulsion | 6 | 1 | 1 |
| | (103) | (203) | (303) |
| acrylic ester emulsion | 5 | 2 | 0 |
| | (104) | (204) | (304) |
| ethylene/vinyl acetate copolymer emulsion | 10 | 1 | 1 |
| | (105) | (205) | (305) |
| SBR-A | 3 | 2 | 0 |
| | (106) | (206) | (306) |
| SBR-C | 11 | 3 | 3 |
| | (107) | (207) | (307) |
| VAc/Veova (powder) | 20 | 3 | 3 |
| | (108) | (208) | (308) |
| VAc Veova/vinyl laurate (powder) | 7 | 4 | 3 |
| | (109) | (209) | (309) |
| (3) After drying-immersion repetition (D) Drying after carbonization, then immersion in saline solution | | | |
| no such polymer dispersion was added added | 20 | 4 | 3 |
| | (101) | (201) | (301) |
| ethylene/vinyl acetate/vinyl | 2 | 2 | 1 |

TABLE 2-continued

|  | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
|---|---|---|---|
| ethylene/vinyl acetate/vinyl chloride copolymer emulsion | 6 (102) | 1 (202) | 0 (302) |
| acrylic ester/styrene copolymer emulsion | 7 (103) | 2 (203) | 0 (303) |
| acrylic ester emulsion | 10 (104) | 1 (204) | 1 (304) |
| ethylene/vinyl acetate copolymer emulsion | 2 (105) | 2 (205) | 0 (305) |
| SBR-A | 11 (106) | 3 (206) | 3 (306) |
| SBR-C | 20 (107) | 3 (207) | 1 (307) |
| VAc/Veova (powder) | 7 (108) | 3 (208) | 2 (308) |
| VAc Veova/vinyl laurate (powder) | (109) | (209) | (309) |

TABLE 3

| | Water absorption (%) | | |
|---|---|---|---|
|  | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| no such polymer dispersion was added | 12.4 (101) | 12.2 (201) | 5.9 (301) |
| ethylene/vinyl acetate/vinyl chloride copolymer emulsion | 4.4 (102) | 7.1 (202) | 2.8 (302) |
| acrylic ester/styrene copolymer emulsion | 7.3 (103) | 2.8 (203) | 1.5 (303) |
| acrylic ester emulsion | 4.7 (104) | 3.7 (204) | 1.5 (304) |
| ethylene/vinyl acetate copolymer emulsion (105) | 2.8 (205) | 3.7 (305) | 2.0 |
| SBR-A | 4.5 (106) | 4.0 (206) | 1.4 (306) |
| SBR-C | 6.8 (107) | 7.1 (207) | 2.7 (307) |
| VAc/Veova (powder) | 12.7 (108) | 6.3 (208) | 2.9 (308) |
| VAc Veova/vinyl laurate (powder) | 7.3 (109) | 6.1 (209) | 2.6 (309) |

TABLE 4

| | Weight change | | |
|---|---|---|---|
|  | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| *(1) After carbonization* | | | |
| no such polymer dispersion was added | 6.3 (101) | 4.0 (201) | 2.1 (301) |
| ethylene/vinyl acetate/vinyl chloride copolymer emulsion | 2.3 (102) | 1.8 (202) | 0.7 (302) |
| acrylic ester/styrene copolymer emulsion | 3.7 (103) | 0.9 (203) | 0.2 (303) |
| acrylic ester emulsion | 3.2 (104) | 1.5 (204) | 0.2 (304) |
| ethylene/vinyl acetate copolymer emulsion | 4.8 (105) | 1.4 (205) | 0.5 (305) |
| SBR-A | 2.2 (106) | 1.6 (206) | 0.3 (306) |
| SBR-C | 5.0 (107) | 2.8 (207) | 2.2 (307) |
| VAc/Veova (powder) | 7.0 (108) | 2.4 (208) | 1.5 (308) |
| VAc Veova/vinyl laurate (powder) | 4.8 (109) | 2.1 (209) | 1.6 (309) |
| *(2) After drying-immersion repetition* | | | |
| *(A) Drying under standard, then immersion in water* | | | |
| no such polymer dispersion was added | 1.9 (101) | 4.5 (201) | 2.5 (301) |
| ethylene/vinyl acetate/vinyl chloride copolymer emulsion | 1.3 (102) | 3.6 (202) | 1.6 (302) |

TABLE 4-continued

| | Weight change | | |
|---|---|---|---|
| | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| acrylic ester/styrene copolymer emulsion | 1.9 (103) | −1.7 (203) | −1.0 (303) |
| acrylic ester emulsion | −0.2 (104) | −1.1 (204) | −1.2 (304) |
| ethylene/vinyl acetate copolymer emulsion | 0.1 (105) | −0.4 (205) | −1.5 (305) |
| SBR-A | 1.8 (106) | 1.3 (206) | −0.5 (306) |
| SBR-C | 0.1 (107) | 0.9 (207) | −1.8 (307) |
| VAc/Veova (powder) | 1.9 (108) | 1.4 (208) | 0.1 (308) |
| VAc Veova/vinyl laurate (powder) | 1.3 (109) | 0.8 (209) | −0.8 (309) |
| (2) After drying-immersion repetition (B) Drying under standard, then immersion in saline solution | | | |
| no such polymer dispersion was added | 7.3 (101) | 7.5 (201) | 3.9 (301) |
| ethylene/vinyl acetate/vinyl chloride copolymer emulsion | 1.4 (102) | 3.8 (202) | 0.8 (302) |
| acrylic ester/styrene copolymer emulsion | 4.5 (103) | −1.2 (203) | −0.9 (303) |
| acrylic ester emulsion | 0.3 (104) | −0.5 (204) | −1.1 (304) |
| ethylene/vinyl acetate copolymer emulsion | 0.1 (105) | −0.7 (205) | −1.5 (305) |
| SBR-A | 2.6 (106) | 1.8 (206) | −0.7 (306) |
| SBR-C | 5.0 (107) | 3.1 (207) | −1.6 (307) |
| VAc/Veova (powder) | 3.8 (108) | 2.2 (208) | 0.2 (308) |
| VAc Veova/vinyl laurate (powder) | 2.4 (109) | 1.0 (209) | −0.8 (309) |
| (2) After drying-immersion repetition (C) Drying after carbonization, then immersion in water | | | |
| no such polymer dispersion was added | 0.2 (101) | 4.0 (201) | 2.2 (301) |
| ethylene/vinyl acetate/vinyl chloride copolymer emulsion | 1.0 (102) | 3.0 (202) | 1.3 (302) |
| acrylic ester/styrene copolymer emulsion | 0.2 (103) | −1.3 (203) | −1.0 (303) |
| acrylic ester emulsion | −0.4 (104) | −0.9 (204) | −1.1 (304) |
| ethylene/vinyl acetate copolymer emulsion | −0.1 (105) | 0 (205) | −1.2 (305) |
| SBR-A | −0.3 (106) | −0.3 (206) | −0.8 (306) |
| SBR-C | −0.1 (107) | 0 (207) | −1.4 (307) |
| VAc/Veova (powder) | −0.1 (108) | 0.2 (208) | 0.1 (308) |
| VAc Veova/vinyl laurate (powder) | 1.0 (109) | −0.1 (209) | −0.9 (309) |
| (2) After drying-immersion repetition (D) Drying after carbonization, then immersion in saline solution | | | |
| no such polymer dispersion was added | 4.1 (101) | 6.6 (201) | 3.5 (301) |
| ethylene/vinyl acetate/vinyl chloride copolymer emulsion | 1.2 (102) | 3.4 (202) | 1.2 (302) |
| acrylic ester/styrene copolymer emulsion | −0.2 (103) | −1.0 (203) | −1.0 (303) |
| acrylic ester emulsion | −0.2 (104) | −0.1 (204) | −1.1 (304) |
| ethylene/vinyl acetate copolymer emulsion | 0 (105) | −0.7 (205) | −1.4 (305) |
| SBR-A | 0.1 (106) | 1.1 (206) | −1.1 (306) |
| SBR-C | 0 (107) | 2.1 (207) | −1.5 (307) |
| VAc/Veova (powder) | 0.9 (108) | 1.2 (208) | 0.3 (308) |
| VAc Veova/vinyl laurate (powder) | 0.6 (109) | 0.2 (209) | −1.1 (309) |

TABLE 5

| | Formation of cracks | | |
|---|---|---|---|
| | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| (1) Drying after under standard, then immersion in water | | | |
| no such polymer dispersion was added | + (101) | + (201) | + (301) |
| ethylene/vinyl acetate/vinyl chloride copolymer emulsion | − (102) | + (202) | − (302) |
| acrylic ester/styrene copolymer emulsion | − (103) | + (203) | + (303) |
| acrylic ester emulsion | − (104) | + (204) | + (304) |
| ethylene/vinyl acetate acetate copolymer emulsion | − (105) | + (205) | − (305) |
| SBR-A | − (106) | + (206) | − (306) |
| SBR-C | − (107) | + (207) | − (307) |
| VAc/Veova (powder) | − (108) | + (208) | − (308) |
| VAc Veova/vinyl laurate (powder) | − (109) | + (209) | + (309) |
| (2) Drying under standard, then immersion in saline solution | | | |
| no such polymer dispersion was added | + (101) | + (201) | + (301) |
| ethylene/vinyl acetate/vinyl chloride copolymer emulsion | − (102) | + (202) | − (302) |
| acrylic ester/styrene copolymer emulsion | − (103) | − (203) | − (303) |
| acrylic ester emulsion | − (104) | + (204) | − (304) |
| ethylene/vinyl acetate copolymer emulsion | − (105) | + (205) | − (305) |
| SBR-A | + (106) | + (206) | − (306) |
| SBR-C | + (107) | + (207) | − (307) |
| VAc/Veova (powder) | + (108) | + (208) | − (308) |
| VAc Veova/vinyl laurate (powder) | + (109) | + (209) | + (309) |
| (31) Drying after carbonization, then immersion in water | | | |
| no such polymer dispersion was added | + (101) | + (201) | + (301) |
| ethylene/vinyl acetate/vinyl chloride copolymer emulsion | − (102) | + (202) | − (302) |
| acrylic ester/styrene copolymer emulsion | − (103) | − (203) | + (303) |
| acrylic ester emulsion | − (104) | + (204) | − (304) |
| ethylene/vinyl acetate copolymer emulsion | − (105) | + (205) | − (305) |
| SBR-A | − (106) | + (206) | − (306) |
| SBR-C | + (107) | + (207) | + (307) |
| VAc/Veova (powder) | − (108) | + (208) | + (308) |
| VAc Veova/vinyl laurate (powder) | − (109) | + (209) | + (309) |
| (4) Drying after carbonization, then immersion in saline solution | | | |
| no such polymer dispersion was added | + (101) | + (201) | + (301) |
| ethylene/vinyl acetate/vinyl chloride copolymer emulsion | − (102) | + (202) | − (302) |
| acrylic ester/styrene copolymer emulsion | − (103) | + (203) | − (303) |
| acrylic ester emulsion | − (104) | + (204) | − (304) |
| ethylene/vinyl acetate copolymer emulsion | − (105) | + (205) | − (305) |
| SBR-A | − (106) | + (206) | − (306) |
| SBR-C | + (107) | + (207) | + (307) |
| VAc/Veova (powder) | − (108) | + (208) | + (308) |
| VAc Veova/vinyl | − | + | + |

TABLE 5-continued

| | Formation of cracks | | |
|---|---|---|---|
| | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| laurate (powder) | (109) | (209) | (309) |

TABLE 6

| | Presence or absence of alkalinity in reinforcement atmosphere mortar | | |
|---|---|---|---|
| | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| (1) Drying under standard, then immersion in water | | | |
| no such polymer dispersion was added | O (101) | O (201) | O (301) |
| ethylene/vinyl acetate/vinyl chloride copolymer emulsion | Δ (102) | O (202) | O (302) |
| acrylic ester/styrene copolymer emulsion | O (103) | O (203) | O (303) |
| acrylic ester emulsion | O (104) | O (204) | O (304) |
| ethylene/vinyl acetate cpolymer emulsion | Δ (105) | O (205) | O (305) |
| SBR-A | O (106) | O (206) | O (306) |
| SBR-C | O (107) | O (207) | O (307) |
| VAc/Veova (powder) | O (108) | O (208) | O (308) |
| VAc Veova/vinyl laurate (powder) | O (109) | O (209) | O (309) |
| (2) Drying under standard, then immersion in saline solution | | | |
| no such polymer dispersion was added | O (101) | O (201) | O (301) |
| ethylene/vinyl acetate/vinyl chloride copolymer emulsion | O (102) | O (202) | O (302) |
| acrylic ester/styrene copolymer emulsion | O (103) | O (203) | O (303) |
| acrylic ester emulsion | O (104) | O (204) | O (304) |
| ethylene/vinyl acetate cpolymer emulsion | O (105) | O (205) | O (305) |
| SBR-A | O (106) | O (206) | O (306) |
| SBR-C | O (107) | O (207) | O (307) |
| VAc/Veova (powder) | O (108) | O (208) | O (308) |
| VAc Veova/vinyl laurate (powder) | O (109) | O (209) | O (309) |
| (3) Drying after carbonization, then immersion in water | | | |
| no such polymer dispersion was added | X (101) | O (201) | Δ (301) |
| ethylene/vinyl acetate/vinyl chloride copolymer emulsion | Δ (102) | O (202) | O (302) |
| acrylic ester/styrene copolymer emulsion | Δ (103) | Δ (203) | O (303) |
| acrylic ester emulsion | Δ | O | O |
| ethylene/vinyl acetate copolymer emulsion | Δ (105) | O (205) | O (305) |
| SBR-A | Δ (106) | O (206) | O (306) |
| SBR-C | X (107) | X (207) | Δ (307) |
| VAc/Veova (powder) | X (108) | O (208) | O (308) |
| VAc Veova/vinyl laurate (powder) | Δ (109) | Δ (209) | Δ (309) |
| (4) Drying after carbonization, then immersion in saline solution | | | |
| no such polymer dispersion was added | X (101) | O (201) | Δ (301) |
| ethylene/vinyl acetate/vinyl chloride copolymer emulsion | Δ (102) | O (202) | O (302) |
| acrylic ester/styrene cpolymer emulsion | Δ (103) | O (203) | Δ (303) |
| acrylic ester emulsion | Δ | O | O |

TABLE 6-continued

| | Presence or absence of alkalinity in reinforcement atmosphere mortar | | |
|---|---|---|---|
| | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| ethylene/vinyl acetate copolymer emulsion | (104) Δ | (204) Δ | (304) O |
| SBR-A | (105) Δ | (205) Δ | (305) O |
| SBR-C | (106) X | (206) Δ | (306) Δ |
| VAc/Veova (powder) | (107) X | (207) Δ | (307) O |
| VAc Veova/vinyl laurate (powder) | (108) Δ | (208) Δ | (308) O |
| | (109) | (209) | (309) |

TABLE 7

| | Area of reinforcement rusting (%) | | |
|---|---|---|---|
| | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| (1) Drying under standard, then immersion in water | | | |
| no such polymer dispersion was added | 0 (101) | 0 (201) | 0 (301) |
| ethylene/vinyl acetate/vinyl chloride copolymer emulsion | 3.1 (102) | 0 (202) | 3.6 (302) |
| acrylic ester/styrene copolymer emulsion | 0 (103) | 0 (203) | 0 (303) |
| acrylic ester emulsion | 0 (104) | 0 (204) | 0 (304) |
| ethylene/vinyl acetate copolymer emulsion | 0 (105) | 0 (205) | 0 (305) |
| SBR-A | 0 (106) | 0 (206) | 0 (306) |
| SBR-C | 0 (107) | 0 (207) | 0 (307) |
| VAc/Veova (powder) | 3.9 (108) | 0 (208) | 0 (308) |
| VAc Veova/vinyl laurate (powder) | 1.4 (109) | 0 (209) | 0 (309) |
| (2) Drying under standard then immersion in saline solution | | | |
| no such polymer dispersion was added | 92.1 (101) | 50.3 (201) | 0 (301) |
| ethylene/vinyl acetate/vinyl chloride copolymer emulsion | 1.5 (102) | 5.9 (202) | 2.2 (302) |
| acrylic ester/styrene copolymer emulsion | 9.5 (103) | 7.1 (203) | 0 (303) |
| acrylic estee emulsion | 0 (104) | 5.1 (204) | 0 (304) |
| ethylene/vinyl acetate copolymer emulsion | 0 (105) | 19.9 (205) | 0 (305) |
| SBR-A | 0 (106) | 4.9 (206) | 0 (306) |
| SBR-C | 9.5 (107) | 22.6 (207) | 0 (307) |
| VAc/Veova (powder) | 60.5 (108) | 28.1 (208) | 10.6 (308) |
| VAc Veova/vinyl laurate (powder) | 24.5 (109) | 57.4 (209) | 0 (309) |
| (3) Drying after carbonization, then immersion in water | | | |
| no such polymer dispersion was added | 97.6 (101) | 100.0 (201) | 87.8 (301) |
| ethylene/vinyl acetate/vinyl chloride copolymer emulsion | 34.1 (102) | 73.8 (202) | 58.9 (302) |
| acrylic ester/styrene copolymer emulsion | 87.1 (103) | 58.1 (203) | 56.3 (303) |
| acrylic ester emulsion | 45.8 (104) | 43.0 (204) | 38.9 (304) |
| ethylene/vinyl acetate copolymer emulsion | 71.8 (105) | 67.9 (205) | 59.3 (305) |
| SBR-A | 65.1 (106) | 47.1 (206) | 28.4 (306) |
| SBR-C | 97.2 (107) | 100.0 (207) | 51.9 (307) |
| VAc/Veova (powder) | 91.4 | 100.0 | 88.2 |

TABLE 7-continued

| | Area of reinforcement rusting (%) | | |
|---|---|---|---|
| | 1:3 mixture of portland cement and aggregate aggregate smaller than 0.3 mm in diameter | 1:1 mixture of portland cement and aggregate aggregate smaller than 0.3 mm in diameter | 1:2.33 mixture of portland cement and aggregate aggregate smaller than 1.2 mm in diameter |
| | (108) | (208) | (308) |
| VAc Veova/vinyl laurate (powder) | 95.7 | 94.1 | 74.6 |
| | (109) | (209) | (309) |
| (4) Drying after carbonization, then immersion in saline solution | | | |
| no such polymer dispersion was added | 100.0 | 100.0 | 89.4 |
| | (101) | (201) | (301) |
| ethylene/vinyl acetate/vinyl chloride copolymer emulsion | 29.6 | 76.1 | 91.4 |
| | (102) | (202) | (302) |
| acrylic ester/styrene copolymer emulsion | 84.3 | 63.6 | 27.1 |
| | (103) | (203) | (303) |
| acrylic ester emulsion | 35.7 | 64.8 | 32.8 |
| | (104) | (204) | (304) |
| ethylene/vinyl acetate copolymer emulsion | 77.3 | 55.8 | 37.3 |
| | (105) | (205) | (305) |
| SBR-A | 55.1 | 47.5 | 33.7 |
| | (106) | (206) | (306) |
| SBR-C | 98.0 | 75.3 | 29.1 |
| | (107) | (207) | (307) |
| VAc/Veova (powder) | 100.0 | 100.0 | 76.9 |
| | (108) | (208) | (308) |
| VAc Veova/vinyl laurate (powder) | 96.4 | 100.0 | 73.8 |
| | (109) | (209) | (309) |

What is claimed is:

1. A method for repairing and restoring a deteriorated reinforced concrete, comprising the first step in which a solution of lithium silicate is applied to the surface of said reinforced concrete to infiltrate said solution into the body of said reinforced concrete, the second step in which the surface of the reinforced concrete which has undergone said first step treatment is topcoated with cement paste of the following composition (A), and the third step in which the surface of the cement paste coating formed in the second step is further coated with mortar of the following composition (B):

composition (A):
(a) cement: 40–60 parts
(b) aggregate smaller than 0.3 mm in size: 60–40 parts
(c) anion-polymerized styrene/butadiene rubber latex (solid content): 2–8 parts compositon (B):
(a) cement: 20–40 parts
(b) aggregate smaller than 1.2 mm in size: 80–60 parts
(c) anion-polymerized styrene/butadiene rubber latex (solid content): 2–8 parts.

2. A method for repairing and restoring a deteriorated reinforced concrete, comprising the first step in which a solution of lithium silicate is applied to the surface of said reinforced concrete to infiltrate said solution into the body of said reinforced concrete, and the second step in which the surface of the reinforced concrete which has undergone said first step treatment is topcoated with mortar of the following composition (B):

composition (B):
(a) cement: 20–40 parts
(b) aggregate smaller than 1.2 mm in size: 80–60 parts
(c) anion-polymerized styrene/butadiene rubber dispersion (solid content): 2–8 parts.

3. A method according to claim 1 wherein said reinforced concrete contains reinforcement subject to deterioration by rusting and the application of said first, second and third step prevents rusting of the reinforcement.

4. A method according to claim 2 wherein said reinforced concrete contains reinforcement subject to deterioration by rusting and the application of said first and second step prevents rusting of the reinforcement.

* * * * *